June 13, 1950   A. V. LOUGHREN   2,511,595
HIGH-FREQUENCY PULSE GENERATOR
Filed Feb. 27, 1945
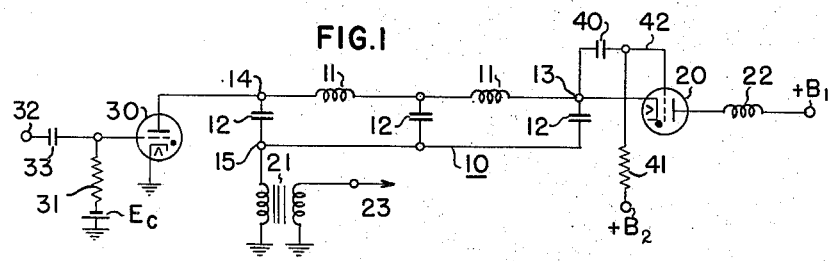
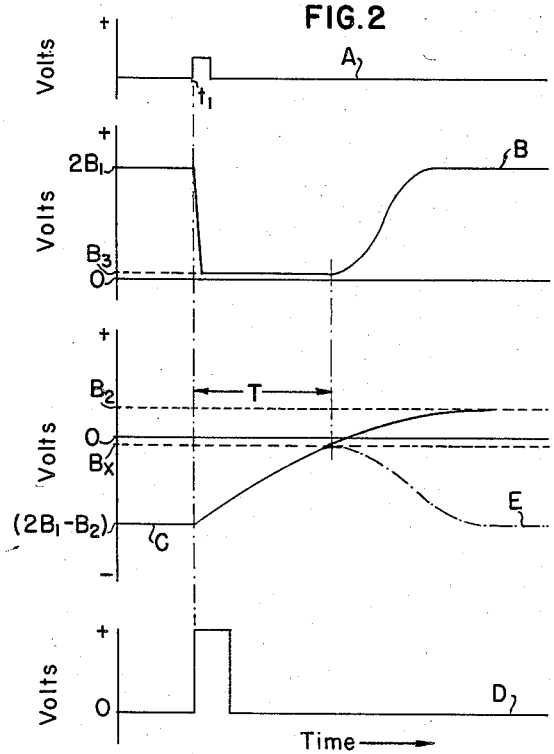
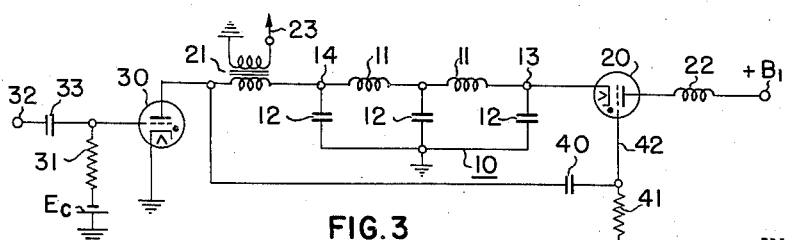
*INVENTOR.*
ARTHUR V. LOUGHREN
BY *Harry B. Page*
ATTORNEY Patented June 13, 1950

2,511,595

UNITED STATES PATENT OFFICE 2,511,595

HIGH-FREQUENCY PULSE GENERATOR

Arthur V. Loughren, Great Neck, N. Y., assignor, by mesne assignments, to Hazeltine Research, Inc., Chicago, Ill., a corporation of Illinois Application February 27, 1945, Serial No. 579,909

14 Claims. (Cl. 250—27)

This invention relates, in general, to high-frequency pulse generators and is particularly directed to generators of the type wherein desired pulses are obtained through the periodic charging and discharging of an energy-storage device. As employed in the specification and in the appended claims, the expression "high-frequency pulse generator" is intended to designate a generator of pulses occurring at high repetition frequencies.

In one arrangement of the type under consideration a transmission-line section is utilized as an energy-storage device, being charged from a potential source through a resistor of high value and being discharged through a gas-filled electron-discharge device coupled to the line section. It may be demonstrated that such a generator supplies an output pulse of substantially rectangular wave form having a duration approximately equal to $2\sqrt{LC}$, where L and C designate the total inductance and capacitance, respectively, of the transmission-line section. The described arrangement has the advantage of being able to translate signals of high power while operating at the usual low-value tube voltages. This obviates the necessity of an elaborate high-voltage power supply, reduces the equipment cost and minimizes shock hazards. However, such arrangements are limited to the generation of pulse signals having relatively low repetition frequencies since at high frequencies the charging resistor prevents full charging of the transmission-line section in the interval between the generated pulses. In the usual case, a charging resistor of high value is required to provide a charging time constant long enough that complete deionization of the gas tube may take place before the line section receives a second charge. In view of this operating requirement, it is not feasible to reduce the magnitude of the charging resistor to accommodate high repetition frequencies.

In other generators of the prior art, the transmission-line section is charged through a half-wave rectifier from a suitable alternating-current source of relatively low frequency. In operation, the line is charged during a conductive interval of the rectifier and is discharged early in the next succeeding nonconductive interval thereof. In this arrangement the recharging of the transmission-line section is automatically delayed during the nonconductive interval of the rectifier. Thus, the delay in recharging the line is for a period which is very much longer than the deionization interval of the gas-filled tube through which the line section is discharged. As a result, arrangements of this type are limited to the generation of pulse signals having a low repetition frequency equal to the frequency of the alternating-current source.

It is an object of the invention, therefore, to provide a pulse generator which avoids one or more of the above-mentioned limitations of prior-art arrangements.

It is another object of the invention to provide an improved high-frequency pulse generator of the type wherein an energy-storage device is periodically charged and discharged, the discharge being through a gas-filled device.

It is a specific object of the invention to provide an improved high-frequency pulse generator including an energy-storage device which is periodically and rapidly charged through a first gas-filled device and periodically and rapidly discharged through a second gas-filled device.

A high-frequency pulse generator in accordance with the invention comprises an energy-storage device, charging means including a first source of potential coupled thereto and a gas-filled electron-discharge means connected to the energy-storage device for discharging the device to generate an output pulse. The generator includes a control circuit for the charging means effectively including a second source of potential and including a condenser to be charged from said first source of potential in response to the charging of the energy-storage device to develop a blocking potential and to be discharged in response to the discharging of the energy-storage device to decrease the magnitude of the blocking potential. Additionally, the generator has means coupled to said second source of potential for continuously applying the developed blocking potential to the charging means to control the recharging of the energy-storage device by its charging means so that the current flow in the gas-filled discharge means during the recharging of the energy-storage device is less than that required to sustain ionization.

For a better understanding of the present invention, together with other and further objects thereof, reference is had to the following description taken in connection with the accompanying drawing, and its scope will be pointed out in the appended claims.

In the drawing,

Fig. 1 is a schematic circuit diagram of a high-frequency pulse generator in accordance with the invention; Fig. 2 comprises a series of curves utilized in explaining the operation of the Fig. 1 arrangement; and Fig. 3 is a modified form of the generator of Fig. 1.

Referring now more particularly to Fig. 1, the high-frequency pulse generator there represented comprises an energy-storage device in the form of an artificial or simulated transmission-line section 10. The line is constructed of lumped circuit elements including series-connected inductors 11 and intermediate shunt-connected condensers 12, arranged to define filter sections. A sufficient number of such filter sections are provided so that line section 10, in discharging, delivers energy to a load circuit substantially continuously during a desired pulse interval. The described energy-storage device has a predetermined capacitance, representing the total capacitance of its shunt-connected condensers 12.

There is associated with line section 10 a charging means of the electron-discharge type for charging the line to a predetermined potential. This means is provided by a first gas-filled tube 20 having an anode, a cathode and a control electrode. The cathode of tube 20 is connected with an input terminal 13 of line section 10 so that this line section is included in the cathode circuit of the charging tube. The cathode circuit of tube 20 is completed through the primary winding of a pulse transformer 21. A first source of potential or space current, indicated $+B_1$, is coupled to the anode of tube 20 through a charging inductor 22, completing the charging circuit for line 10. The anode-cathode circuit of tube 20 is so proportioned that the line-charging circuit has a short or fast charging time constant. To this end, inductor 22, which constitutes the major inductive reactance of the charging circuit, is selected of such value as to form with the capacitance of line section 10 a series-resonant circuit, resonant at approximately one-half the highest repetition frequency of the generator.

The generator also includes a second gas-filled electron-discharge means for discharging line section 10 to generate an output pulse. This means comprises a tube 30 which, like tube 20, is filled with an ionizable gas such as argon, xenon, or hydrogen. Tube 30 has anode and cathode electrodes connected by way of the primary winding of transformer 21 to the output terminals 14 and 15 of the line section. The control electrode of tube 30 is normally maintained at a negative potential with reference to the cathode thereof to hold tube 30 in its nonconducting condition, the bias potential being supplied by potential source $E_c$ through a resistor 31. A control or synchronizing input terminal 32, coupled to the control electrode through a condenser 33, constitutes means for timing the initiation of electron discharges in tube 30. Through the application of a periodic synchronizing or control signal to input terminal 32 the generator may be controlled to generate pulses having a repetition frequency determined by and corresponding to the frequency of the control signal.

As is characteristic of gas-filled tubes of the type embodied in the signal generator, the occurrence of an electron discharge in tube 30 is associated with a high degree of ionization of the ionizable gas contained within the tube. For the control electrode to regain control over the discharge phenomena after the tube has once been fired, it is necessary that the gas deionize. In particular, deionization must take place to the extent that the control electrode is not shielded by positive-ion sheaths and ignition cannot occur when the anode-cathode potential is reapplied. To accomplish this result, the generator further comprises a control circuit for the charging tube 20.

The control circuit includes a condenser 40 to be charged in response to the charging of line section 10 to develop a control potential and to be discharged in response to the discharging of the line section. Condenser 40 has a small capacitance as compared with that of line section 10 and is coupled to the line section to be charged therewith. To this end, one terminal of the condenser is directly coupled to input terminal 13 of the line and the alternate terminal is effectively coupled to the opposite side of the line through an impedance or resistor 41 serially connected with a source of potential of positive polarity, indicated $+B_2$, and the primary winding of transformer 21. Condenser 40 may be charged through a charging circuit including source $+B_1$, inductor 22, tube 20, resistor 41 and source $+B_2$. Its discharge circuit is provided by the series arrangement of resistor 41, potential source $+B_2$ and the primary winding of transformer 21. Potential source $+B_2$ is selected to have a value which is intermediate the potential of line section 10 when the line section is fully charged and the potential drop of tube 30 when the latter is in its conductive state. For the arrangement under consideration, the value of source $+B_2$ is approximately one half that of source $+B_1$. The source of potential $+B_2$ effectively constitutes a second source of potential although it will be manifest that it may be a tap on a voltage divider coupled to the source $+B_1$. Also, it is preferred that resistor 41 and condenser 40 be so selected that the time constants of the charging and discharging circuits, respectively, of the condenser are short with reference to the minimum period between generated pulses and long with reference to the deionization interval of gas tube 30. The significance of this selection of elements 40 and 41 will be made clear hereinafter.

One terminal of condenser 40 is connected through a conductor 42 to the control electrode of charging tube 20 to provide means for utilizing the control potential developed by condenser 40 to control the recharging of line section 10 by tube 20 so that the current flow in gas tube 30 during the recharging of the line section is less than that required to sustain ionization. More particularly, condenser 40 is so coupled to the control electrode of tube 20 that the control potential is applied with negative polarity as a blocking potential to the charging tube to delay the recharging of line section 10 to permit deionization to take place in tube 30.

The pulses generated through the periodic charging and discharging of line section 10 are supplied from the secondary winding of pulse transformer 21 to a utilizing circuit, as indicated by arrow 23. Preferably, the load circuit of the transformer is so arranged that when an electron discharge occurs in tube 30, the impedance coupled across terminals 14, 15 of line section 10 corresponds to its characteristic impedance. This proportioning of the transformer load circuit assures maximum power transfer from the generator.

In considering the operation of the pulse generator, let it be assumed that line section 10 has been fully charged through tube 20. For this condition the potential appearing across the terminals of the line is approximately twice the value of potential source $+B_1$ of tube 20. The magnitude of the line potential follows from the use of a series-resonant charging circuit because in such a circuit the potential developed across its inductive or capacitive reactance may readily approach twice the value of the charging source. This potential at the line terminals raises the potential level of the cathode of charging tube 20 and the anode of discharging tube 30 corresponding amounts, biasing tube 20 to is nonconductive condition while tube 30 is maintained in a nonconductive state by its bias potential $E_c$. Also, the line may be considered as a charging source for condenser 40, charging the condenser with the line through resistor 41 to a potential corresponding to the potential difference of the line terminals and source $+B_2$ which is in opposition thereto. Consequently, the control potential established by the charging of condenser 40 has a value approximately equal to $(2B_1-B_2)$ and, as referred to the cathode of tube 20, is of negative polarity. The described conditions are illustrated by the curves of Fig. 2. In this figure curve B represents the cathode potential of tube 20 and the anode potential of tube 30, while curve C represents the potential of the control electrode of tube 20 referred to its cathode. Curve A represents a synchronizing signal applied with positive polarity to input terminal 32 of the generator to initiate an electron discharge in tube 30. Preferably, the synchronizing signal is so delayed with respect to the charging of line section 10 as to occur at a time $t_1$ when charging tube 20 has been substantially deionized following the charging of line section 10. In response to the application of the synchronizing signal, the line section 10 is rapidly discharged through tube 30, supplying an output pulse having a substantially rectangular wave form, as indicated by curve D, to the utilizing circuit through pulse transformer 21. The duration of the generated pulse, as mentioned above, is approximately equal to $2\sqrt{LC}$, where L and C are the total inductance and capacitance, respectively, of the line section.

The discharge of line section 10 in generating an output pulse causes the cathode potential of charging tube 20 to fall quickly to a value $B_3$, representing the potential drop across the discharge tube 30 when the latter is in a conductive state. In view of the long time constant of the discharge path of condenser 40, contributed largely by resistor 41, the potential of the control electrode of tube 20 does not fall as rapidly as the cathode potential and consequently this condenser maintains a holding potential on charging tube 20 to hold this tube in its nonconductive state. The charge on condenser 40 leaks off through resistor 41, causing the holding voltage of tube 20 to decay exponentially. Due to the presence of the positive potential source $+B_2$, condenser 40 loses its negative charge and tends to be recharged in an opposite sense, as represented by curve C. Thus, following the discharge of line section 10 condenser 40 varies the potential of the control electrode of tube 20, as referred to its cathode, from a highly negative value $(2B_1-B_2)$ in the direction of a positive potential approximately equal to $B_2$. However, at some critical control-electrode voltage $B_x$ tube 20 is rendered conductive to recharge line section 10 and re-establish the first-described conditions, interrupting the discharge of condenser 40 and recharging the condenser as represented by the dot-dash curve E. Where the time constant of elements 40 and 41 is proportioned as aforedescribed, charging tube 20 is maintained in its nonconductive state after the firing of tube 30 for an interval T which is short with reference to the minimum period between generated pulses and long with respect to the deionization interval of tube 30. In other words, in the preferred embodiment of the invention the control potential developed by condenser 40 delays the recharging of line section 10 by tube 20 until deionization of tube 30 has taken place.

In view of the delayed recharging of line section 10, control of the electron-discharge phenomena of tube 30 is returned to its control electrode after the generation of each output pulse. After the line has been fully charged a second time, a synchronizing signal applied to input terminal 32 times the generation of the next succeeding pulse. By selecting the charging time constant of the condenser 40 to be short with reference to the period of the synchronizing pulses in the manner described, the holding voltage for tube 20 is developed before tube 30 is triggered and prevents the circuit from establishing a low impedance path across source $+B_1$ through tubes 20 and 30 in series.

Through the expedient of selecting time constant 40, 41 to delay the recharging of line section 10 until deionization of tube 30 is complete, the deionization time of tube 30 has a minimum value. This is a desirable arrangement of the generator in that it permits the generation of pulses having unusually high repetition frequencies. However, while this mode of operation is to be preferred, it is not necessary that the recharging of line section 10 in all cases be delayed until deionization of tube 30 has been completed. This will be understood from the following consideration.

The deionization process of tube 30 is accomplished largely through the recombination of positive and negative ions within its envelope and is governed, among other factors, by the current flow in the tube during its discharge period. Where the recharging of line section 10 is initiated during the deionization time, a potential is applied between the anode and cathode electrodes of tube 30 and may provoke a current flow therein. Any such current flow will produce ionization within the tube but so long as that current is limited to such a value that the resulting ionization rate is less that the recombination or deionization rate the desired deionization process will nevertheless be completed. In such a case, the deionization interval is longer that that experienced when the recharging of line section 10 is delayed until deionization has been completed. Thus, it becomes apparent that, in accordance with the present invention, the recharging of line section 10 may be initiated during the deionization interval of tube 30. Where this mode of operation is employed, the control circuit, including condenser 40 and resistor 41, is adjusted so that the control potential developed thereby controls the recharging of line section 10 by tube 20 in such a manner that the current flow in the discharge tube 30 during the recharging process is less than that required to sustain ionization.

The pulse generator of Fig. 3 is generally similar to that of Fig. 1 and corresponding components thereof are designated by the same reference characters. In this modification, the charging circuit for line section 10 is exclusive of the primary winding of transformer 21. With this arrangement, pulses resulting from the line charging process are isolated from the utilizing circuit. Also, condenser 40 is coupled to transmission-line section 10 through resistor 41 and the primary winding of pulse transformer 21, omitting the potential source +B₂ of Fig. 1. The operation of the Fig. 3 arrangement is generally similar to that described and represented by the curves of Fig. 2. The omission of potential source +B₂ modifies curve C as follows: The blocking potential applied by condenser 40 to the control electrode of tube 20 is approximately equal to the line potential 2B₁ instead of the value (2B₁−B₂); and the potential variation of the control electrode following the discharge of line section 10 approaches a potential level B₃ asymptotically, where B₃ corresponds to the potential drop of tube 30 in its conductive state.

In the Fig. 1 embodiment, voltage source +B₂ has a value of approximately one-half source +B₁, while in the Fig. 3 arrangement the source +B₂ has been omitted. It will be apparent that where the source +B₂ is utilized it may have any value within a comparatively wide range, having as one limit the potential drop of tube 30 in its conductive state, and as its opposite limit the potential to which the line section is charged.

The pulse generators discussed have the advantage over prior-art arrangements that they are capable of producing pulses of exceedingly high repetition frequencies. In fact, these generators may supply pulses having repetition frequencies the periods of which closely approach the reciprocal of the deionization interval of tube 30.

In describing the pulse generators in detail and in the appended claims, line section 10 has been considered to be charged by tube 20 and discharged by tube 30. The terms "charge" and "discharge" are intended to designate changes in charge condition of line section 10 which are of opposite senses.

Pulse generating systems of the type described are subject to a variety of installations. For example, in communication, direction finder and similar systems, the generator may be utilized to control the operation of a wave-signal transmitter. In industrial fields, the generators may be employed in a welding system or other installation.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A high-frequency pulse generator comprising, an energy-storage device, charging means including a first source of potential coupled to said energy-storage device, gas-filled electron-discharge means connected to said energy-storage device for discharging said device to generate an output pulse, a control circuit for said charging means effectively including a second source of potential and including a condenser to be charged from said first source of potential in response to the charging of said energy-storage device to develop a blocking potential and to be discharged in response to the discharging of said energy-storage device to decrease the magnitude of said blocking potential, and means coupled to said second source of potential for continuously applying said blocking potential to said charging means to control the recharging of said energy-storage device by said charging means so that the current flow in said gas-filled means during the recharging of said energy-storage device is less than that required to sustain ionization.

2. A high-frequency pulse generator comprising, an energy-storage device, charging means including a first source of potential coupled to said energy-storage device, gas-filled electron-discharge means connected to said energy-storage device for discharging said device to generate an output pulse, a control circuit for said charging means effectively including a second source of potential and including a condenser coupled to said energy-storage device to be charged therewith from said first source of potential to develop a blocking potential and to be discharged in response to the discharging of said energy-storage device to decrease the magnitude of said blocking potential and means coupled to said second source of potential for continuously applying said blocking potential to said charging means to control the recharging of said energy-storage device by said charging means so that the current flow in said gas-filled means during the recharging of said energy-storage device is less than that required to sustain ionization.

3. A high-frequency pulse generator comprising, an energy-storage device, charging means including a first source of potential coupled to said energy-storage device, gas-filled electron-discharge means connected to said energy-storage device for discharging said device to generate an output pulse, a control circuit for said charging means effectively including a second source of potential and including a condenser to be charged from said first source of potential in response to the charging of said energy-storage device to develop a blocking potential and to be discharged in response to the discharging of said energy-storage device to decrease the magnitude of said blocking potential, an impedance included in said control circuit in series relation with said condenser providing a charging circuit for said condenser having a time constant which is substantially less than the period corresponding to the maximum repetition frequency of the pulses generated by said generator, and means coupled to said second source of potential for continuously applying said blocking potential to said charging means to control the recharging of said energy-storage device by said charging means so that the current flow in said gas-filled means during the recharging of said energy-storage device is less than that required to sustain ionization.

4. A high-frequency pulse generator comprising, an energy-storage device, charging means including a first source of potential coupled to said energy-storage device, gas-filled electron-discharge means connected to said energy-storage device for discharging said device to generate an output pulse, a control circuit for said charging means effectively including a second source of potential and including a condenser to be charged from said first source of potential in response to the charging of said energy-storage device to develop a blocking potential and to be discharged in response to the discharging of said energy-storage device to decrease the magnitude of said blocking potential, an impedance included in said control circuit in series relation with said condenser providing a discharging circuit for said condenser having a time constant long with reference to the deionization interval of said gas-filled means, and means coupled to said second source of potential for continuously applying said blocking potential to said charging means to delay the recharging of said energy-storage device by said charging means for an interval corresponding to a substantial portion of said deionization interval so that the current flow in said gas-filled means during the recharging of said energy-storage device is less than that required to sustain ionization.

5. A high-frequency pulse generator comprising, an energy-storage device, charging means including a first source of potential coupled to said energy-storage device, gas-filled electron-discharge means connected to said energy-storage device for discharging said device to generate an output pulse, a control circuit for said charging means effectively including a second source of potential and including a condenser to be charged from said first source of potential in response to the charging of said energy-storage device to develop a blocking potential and to be discharged in response to the discharging of said energy-storage device to decrease the magnitude of said blocking potential, an impedance included in said control circuit in series relation with said condenser providing a discharging circuit for said condenser having a time constant long with reference to the deionization interval of said gas-filled means, and means coupled to said second source of potential for continuously applying said blocking potential to said charging means to delay the recharging of said energy-storage device by said charging means for an interval at least equal to said deionization interval so that the current flow in said gas-filled means during the recharging of said energy-storage device is less than that required to sustain ionization.

6. A high-frequency pulse generator comprising, an energy-storage device, charging means including a first source of potential coupled to said energy-storage device, gas-filled electron-discharge means connected to said energy-storage device for discharging said device to generate an output pulse, means for timing the initiation of electron discharges in said gas-filled means to control the repetition frequency of pulses generated by said generator, a control circuit for said charging means effectively including a second source of potential and including a condenser to be charged from said first source of potential in response to the charging of said energy-storage device to develop a blocking potential and to be discharged in response to the discharging of said energy-storage device to decrease the magnitude of said blocking potential, an impedance included in said control circuit in series relation with said condenser providing a charging circuit for said condenser having a time constant which is substantially less than the minimum period between generated pulses, and means coupled to said second source of potential for continuously applying said blocking potential to said charging means to control the recharging of said energy-storage device by said charging means so that the current flow in said gas-filled means during the recharging of said energy-storage device is less than that required to sustain ionization.

7. A high-frequency pulse generator comprising, an energy-storage device, charging means including a first source of potential coupled to said energy-storage device, gas-filled electron-discharge means having a control electrode and having anode and cathode electrodes connected to said energy-storage device for discharging said device to generate an output pulse, means for applying a periodic control signal to said control electrode to time the initiation of electron discharges in said gas-filled means to control the repetition frequency of pulses generated by said generator, a control circuit for said charging means effectively including a second source of potential and including a condenser to be charged from said first source of potential in response to the charging of said energy-storage device to develop a blocking potential and to be discharged in response to the discharging of said energy-storage device to decrease the magnitude of said blocking potential, an impedance included in said control circuit in series relation with said condenser providing a charging circuit for said condenser having a time constant which is substantially less than the minimum period between generated pulses, and means coupled to said second source of potential for continuously applying said blocking potential to said charging means to control the recharging of said energy-storage device by said charging means so that the current flow in said gas-filled means during the recharging of said energy-storage device is less than that required to sustain ionization.

8. A high-frequency pulse generator comprising, an energy-storage device, charging means of the electron-discharge type having a control electrode and including a first source of potential coupled to said energy-storage device, gas-filled electron-discharge means connected to said energy-storage device for discharging said device to generate an output pulse, a control circuit for said charging means effectively including a second source of potential and including a condenser to be charged from said first source of potential in response to the charging of said energy-storage device to develop a blocking potential and to be discharged in response to the discharging of said energy-storage device to decrease the magnitude of said blocking potential, and means coupled to said second source of potential for continuously applying said blocking potential with negative polarity to said control electrode of said charging means to control the conductivity thereof and the recharging of said energy-storage device by said charging means so that the current flow in said gas-filled means during the recharging of said energy-storage device is less than that required to sustain ionization.

9. A high-frequency pulse generator comprising, an energy-storage device having a predetermined capacitance, charging means of the electron-discharge type having an anode, a cathode and a control electrode and having a cathode circuit including said energy-storage device, said charging means including a first source of potential, gas-filled electron-discharge means connected to said energy-storage device for discharging said device to generate an output pulse, a control circuit for said charging means effectively including a second source of potential and including a condenser connected to and having a small capacitance as compared with said energy-storage device to be charged therewith from said first source of potential to develop a blocking potential of negative polarity for said charging means and to be discharged in response to the discharging of said energy-storage device to decrease the magnitude of said blocking potential, and means coupled to said second source of potential for coupling said condenser to said control electrode of said charging means continuously to apply said blocking potential thereto to control the recharging of said energy-storage device by said charging means so that the current flow in said gas-filled means during the recharging of said energy-storage device is less than that required to sustain ionization.

10. A high-frequency pulse generator comprising, an energy-storage device having a predetermined capacitance, charging means of the electron-discharge type having an anode, a cathode and a control electrode and having a cathode circuit including said energy-storage device, gas-filled electron-discharge means connected to said energy-storage device for discharging said device to generate an output pulse, a control circuit for said charging means including a condenser connected to and having a small capacitance as compared with said energy-storage device to be charged therewith to develop a blocking potential of negative polarity for said charging means and to be discharged in response to the discharging of said energy-storage device, a source of potential of positive polarity included in said control circuit serially connecting said condenser to said energy-storage device and having a magnitude exceeding the potential drop of said gas-filled means in its conductive state, and means for coupling said condenser to said control electrode of said charging means to apply said blocking potential thereto to control the recharging of said energy-storage device by said charging means so that the current flow in said gas-filled means during the recharging of said energy-storage device is less than that required to sustain ionization.

11. A high-frequency pulse generator comprising, an energy-storage device having a predetermined capacitance, means for charging said energy-storage device to a predetermined potential including an electron-discharge device having an anode, a cathode and a control electrode and having a cathode circuit including said energy-storage device, gas-filled electron-discharge means connected to said energy-storage device for discharging said device to generate an output pulse, a control circuit for said charging means including a condenser connected to and having a small capacitance as compared with said energy-storage device to be charged therewith to develop a blocking potential of negative polarity for said charging means and to be discharged in response to the discharging of said energy-storage device, a source of potential of positive polarity included in said control circuit serially connecting said condenser to said energy-storage device and having a magnitude intermediate said predetermined potential and the potential drop of said gas-filled means in its conductive state, and means for coupling said condenser to said control electrode of said charging means to apply said blocking potential thereto to control the recharging of said energy-storage device by said charging means so that the current flow in said gas-filled means during the recharging of said energy-storage device is less than that required to sustain ionization.

12. A high-frequency pulse generator comprising, an energy-storage device having a predetermined capacitance, charging means of the electron-discharge type having an anode, a cathode and a control electrode and having a cathode circuit including said energy-storage device, gas-filled electron-discharge means having a control electrode and having anode and cathode electrodes connected to said energy-storage device for discharging said device to generate an output pulse, means for applying a periodic control signal to said control electrode to time the initiation of electron discharges in said gas-filled means to control the repetition frequency of pulses generated by said generator, a control circuit for said charging means including a condenser connected to and having a small capacitance as compared with said energy-storage device to be charged therewith to develop a blocking potential of negative polarity for said charging means and to be discharged in response to the discharging of said energy-storage device, a source of potential of positive polarity and a resistor included in said control circuit serially connecting said condenser to said energy-storage device and providing a charging and discharging circuit for said condenser, said source of potential having a magnitude exceeding the potential drop of said gas-filled means in its conductive state and said resistor having such a value that the time constant of said charging and discharging circuit is short with reference to the minimum period between generated pulses and long with respect to the deionization interval of said gas-filled means, and means for coupling said condenser to said control electrode of said charging means to apply said blocking potential thereto to control the recharging of said energy-storage device by said charging means so that the current flow in said gas-filled means during the recharging of said energy-storage device is less than that required to sustain ionization.

13. A high-frequency pulse generator comprising, an energy-storage device, charging means including a first gas-filled electron-discharge means coupled to said energy-storage device, a second gas-filled electron-discharge means connected to said energy-storage device for discharging said device to generate an output pulse, a control circuit for said charging means including a condenser to be charged in response to the charging of said energy-storage device to develop a blocking potential and to be discharged in response to the discharging of said energy-storage device to decrease the magnitude of said blocking potential, and means for continuously applying said blocking potential to said charging means to control the recharging of said energy-storage device by said charging means so that the current flow in said second gas-filled means during the recharging of said energy-storage device is less than that required to sustain ionization.

14. A high-frequency pulse generator comprising, an energy-storage device including a transmission-line section, charging means coupled to said energy-storage device, gas-filled electron-discharge means connected to said energy-storage device for discharging said device to generate an output pulse, a control circuit for said charging means including a condenser to be charged in response to the charging of said energy-storage device to develop a blocking potential and to be discharged in response to the discharging of said energy-storage device to decrease the magnitude of said blocking potential, and means for continuously applying said blocking potential to said charging means to control the recharging of said energy-storage device by said charging means so that the current flow in said gas-filled means during the recharging of said energy-storage device is less than that required to sustain ionization.

ARTHUR V. LOUGHREN.

REFERENCES CITED

The following references are of record in the file of this patent:

UNITED STATES PATENTS

| Number | Name | Date |
|---|---|---|
| 2,071,958 | Watrous, Jr. | Feb. 23, 1937 |
| 2,102,371 | Miller | Dec. 14, 1937 |
| 2,102,951 | Hackenberg | Dec. 21, 1937 |
| 2,235,385 | Rava | Mar. 18, 1941 |
| 2,282,340 | Pieplow | May 12, 1942 |